United States Patent [19]

Kuhn et al.

[11] Patent Number: 5,025,617
[45] Date of Patent: Jun. 25, 1991

[54] IMPLEMENT SUSPENSION MECHANISM

[75] Inventors: John B. Kuhn, Rubicon; Kenneth E. Hunt, Oconomowoc; Christopher S. Thorman, Beaver Dam, all of Wis.

[73] Assignee: Deere & Company, Moline, Ill.

[21] Appl. No.: 488,807

[22] Filed: Mar. 5, 1990

[51] Int. Cl.$^5$ ............................................. A01D 34/64
[52] U.S. Cl. .............................. 56/15.6; 56/DIG. 9; 56/DIG. 22
[58] Field of Search ...................... 56/15.6, 15.7, 15.8, 56/14.9, DIG. 3, DIG. 9, DIG. 10, DIG. 14, DIG. 22; 172/272, 273, 776; 280/727, 762

[56] References Cited

U.S. PATENT DOCUMENTS 4,882,898 11/1989 Samejima et al. ............ 56/DIG. 22

Primary Examiner—Terry Lee Melius

[57] ABSTRACT

A mechanism for suspending an implement from a vehicle, such as a lawn and garden tractor. The mechanism includes front and rear supports between the vehicle and implement, the supports being adapted for quick and easy connection. The rear supports include spring-loaded J-pins connectable with the tractor lift linkage. The front support includes a U-shaped member, the base of which is receivable in upwardly opening jaws carried on the implement. The sides of the U-shaped member serve as draft links and are adjustably coupled with a cross member that is receivable in similar jaws carried by the tractor. A latch handle is connected to a bell crank which is provided on the cross member for tensioning the draft links and securing them in their tensioned configuration.

11 Claims, 3 Drawing Sheets

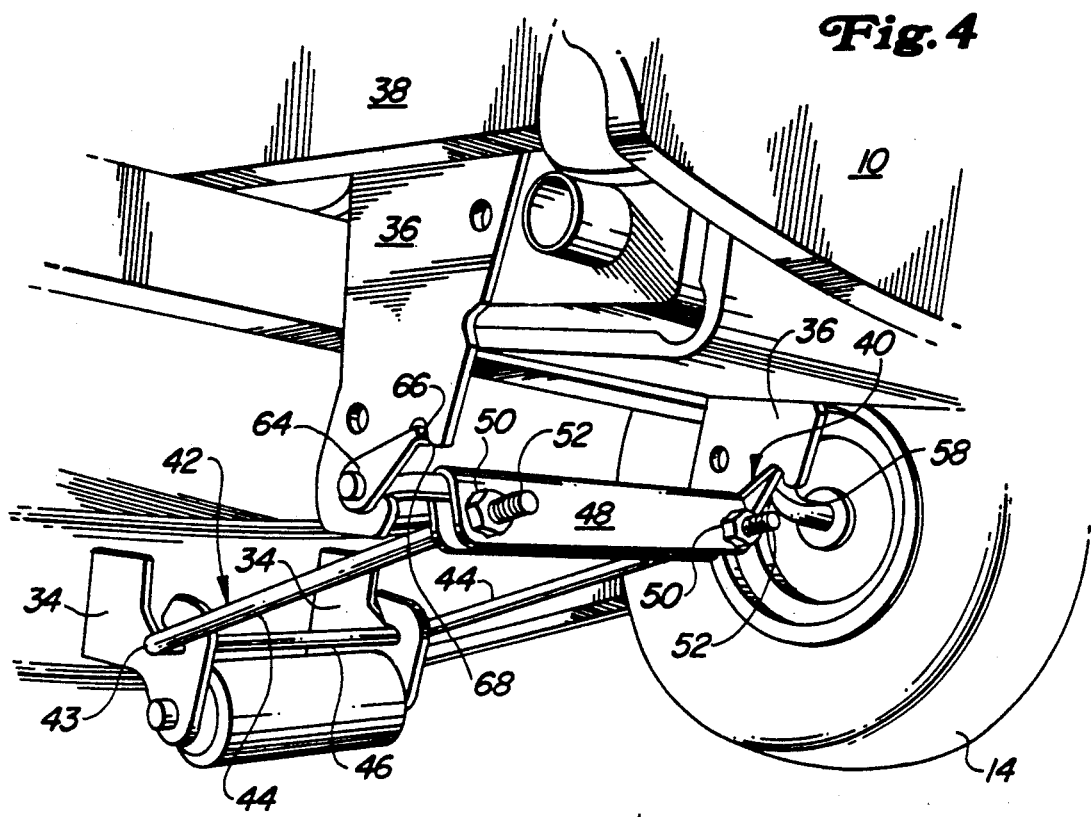

IMPLEMENT SUSPENSION MECHANISM

FIELD OF THE INVENTION

The present invention relates generally to lawn and garden vehicles and specifically to suspension means for mounting an implement such as a mower from such vehicles.

DESCRIPTION OF THE RELATED ART

Mechanisms for suspending a mower from a vehicle, such as a lawn and garden tractor, typically are directed at providing an even cut of grass. Anti-scalp wheels or rollers are usually also provided on the mower to accommodate bumps and other uneven terrain during operation.

Many present suspension devices provide a parallelogram linkage arrangement between the front and back portions of the implement and vehicle to assure that as it is raised or lowered, the sides, front and rear of the mower are lowered or raised equally.

Since mowers and similar implements are not utilized full time with the lawn and garden tractor, such suspension means must further facilitate quick, easy removal and reinstallation of the implement and be comprised of as few parts as realistic. While providing for quick removal or installation, it is also desirable for the suspension means to be simple and yet maintain the parallelogram arrangement between connections on the implement and vehicle to assure that the even cut of grass desired at various heights of adjustment is realized.

SUMMARY OF THE INVENTION

Accordingly, there is provided herein a mechanism which permits quick and easy installation and removal of the implement from the vehicle while also providing a parallelogram arrangement to assure even cuts of grass.

The invention provides a pair of conventional J-shaped spring-loaded pins carried by the mower implement for connecting the rear portions of the mower to the vehicle frame. At the front portion of the mower, there is provided a unique and simple draft linkage to connect the front portion of the mower to the vehicle frame.

The linkage provided at the front of the mower is comprised of two generally parallel and transverse linkage members coupled with two generally fore-and-aft extending transversely spaced linkage members. A pair of upwardly opening jaws are carried on the front portion of the implement frame and the undercarriage of the vehicle for receiving the respective transversely extending linkage members. A tensioning means is provided in the form of a cam and handle and is connected to one transverse linkage member for tensioning the fore-and-aft linkage members after they have been positioned in the respective jaws of the implement and vehicle frame.

Tensioning of the fore-and-aft linkage members provides positive connection points between the mower and vehicle and maintains the desired parallelogram suspension arrangement required for even cuts of grass.

The cam handle carries a tab and is biased toward the vehicle frame member to enable the tab to be received in a recess carried in the frame member to positively lock the handle in place once the links have been tensioned.

A stop member is further provided on the cam member for engaging one surface of the jaw opening and thereby preventing unintended separation of the front transverse linkage member from the vehicle jaws when the mower is backed up.

With the combination of the spring-loaded J-pins at the rear of the mower and the front suspension linkage which permits quick and easy insertion and locking in the mower vehicle jaws, a simple and reliable suspension means is provided that maintains the parallelogram linkage required to facilitate even cuts of grass.

DESCRIPTION OF THE DRAWINGS

FIG. 4 is an enlarged left front side elevational perspective of the front linkage suspension means.

FIG. 5 is an enlarged right front side elevational perspective of the front linkage suspension means.

DESCRIPTION OF THE PREFERRED EMBODIMENT

Figure 1:
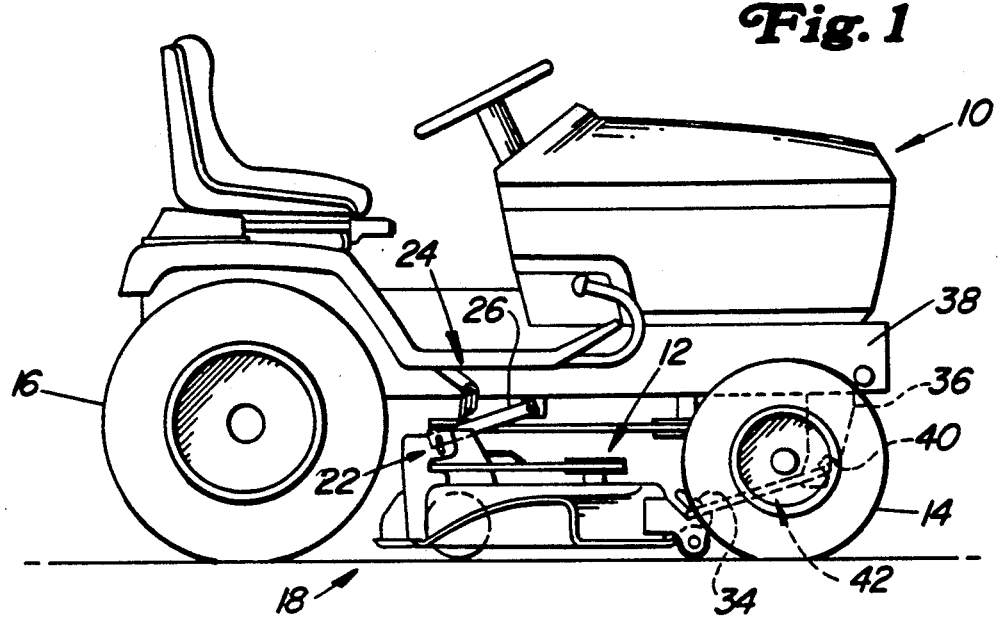
FIG. 1 is a side view of a lawn and garden tractor utilizing the present invention to support a rotary mower therebeneath.

Looking now to FIG. 1 there is illustrated a lawn and garden tractor 10 having a rotary mower 12 suspended therebeneath. The conventional lawn and garden tractor 10 includes front and rear wheels 14 and 16 sufficiently spaced apart to carry the mower 12.

Figure 2:
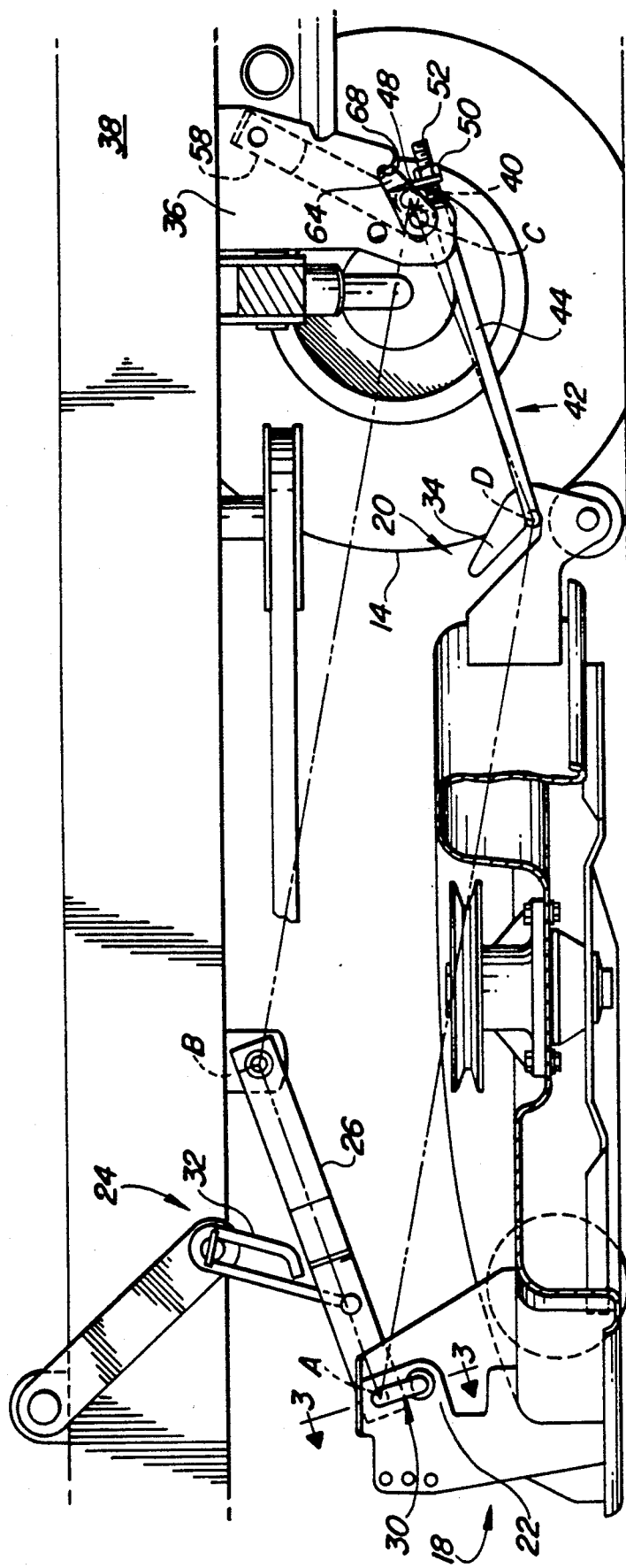
FIG. 2 is an enlarged partial view of the FIG. 1 illustrating in greater detail the present invention.

As illustrated in FIG. 2, provision is made for suspending the rotary mower 12 from the framework of the tractor 10 both at the rear 18 and at the front 20 of the mower 12. The suspension mechanism is designed to provide a four bar parallelogram linkage for equal lifting of the front and rear mower housing 20 and 18 as it is adjusted.

Figure 3:
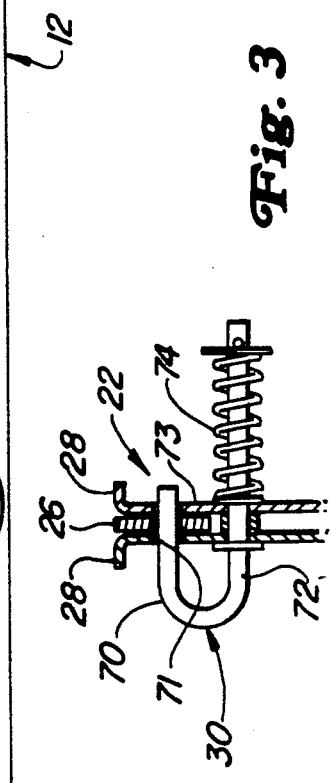
FIG. 3 is an enlarged view of the J-pin bracket arrangement taken along lines 3—3 as shown in FIG. 2.

The mechanism for releasably suspending the implement 12 from the tractor 10 includes a pair of transversely spaced and rearwardly positioned brackets 22. A conventional lift linkage control mechanism 24 includes the lift link 26 for adjusting the height of the mower 12 beneath the tractor 10. The brackets 22 are adapted to receive the lift link 26 of the implement lift linkage mechanism 24 between their respective walls 28. Conventional spring loaded pins means 30 are provided to quickly and positively couple the lift links 26 with the brackets 22. FIG. 3 illustrates in detail the spring loaded J-pin 30 and the lift link 26 as seen along lines 3—3 of FIG. 2.

A lost motion link 32 is provided between the lift link 26 of the tractor lift linkage control mechanism 24 for accommodating upward movement of the mower 12 as uneven terrain is encountered between the front and rear wheels 14 and 16 of the tractor 10.

Provided at the front portion 20 of the mower 12 are a pair of transversely spaced apart and upwardly opening jaw or hook means 34 (see FIGS. 2, 4 and 5). Similarly provided on the downwardly extending brackets 36 carried by the tractor frame 38 are upwardly opening jaw means 40. A hanger means 42 for supporting the implement 12 from the vehicle 10 is provided to interconnect the upwardly opening jaws 34 and 40 carried respectively by the vehicle 10 and the implement 12.

Figure 6:
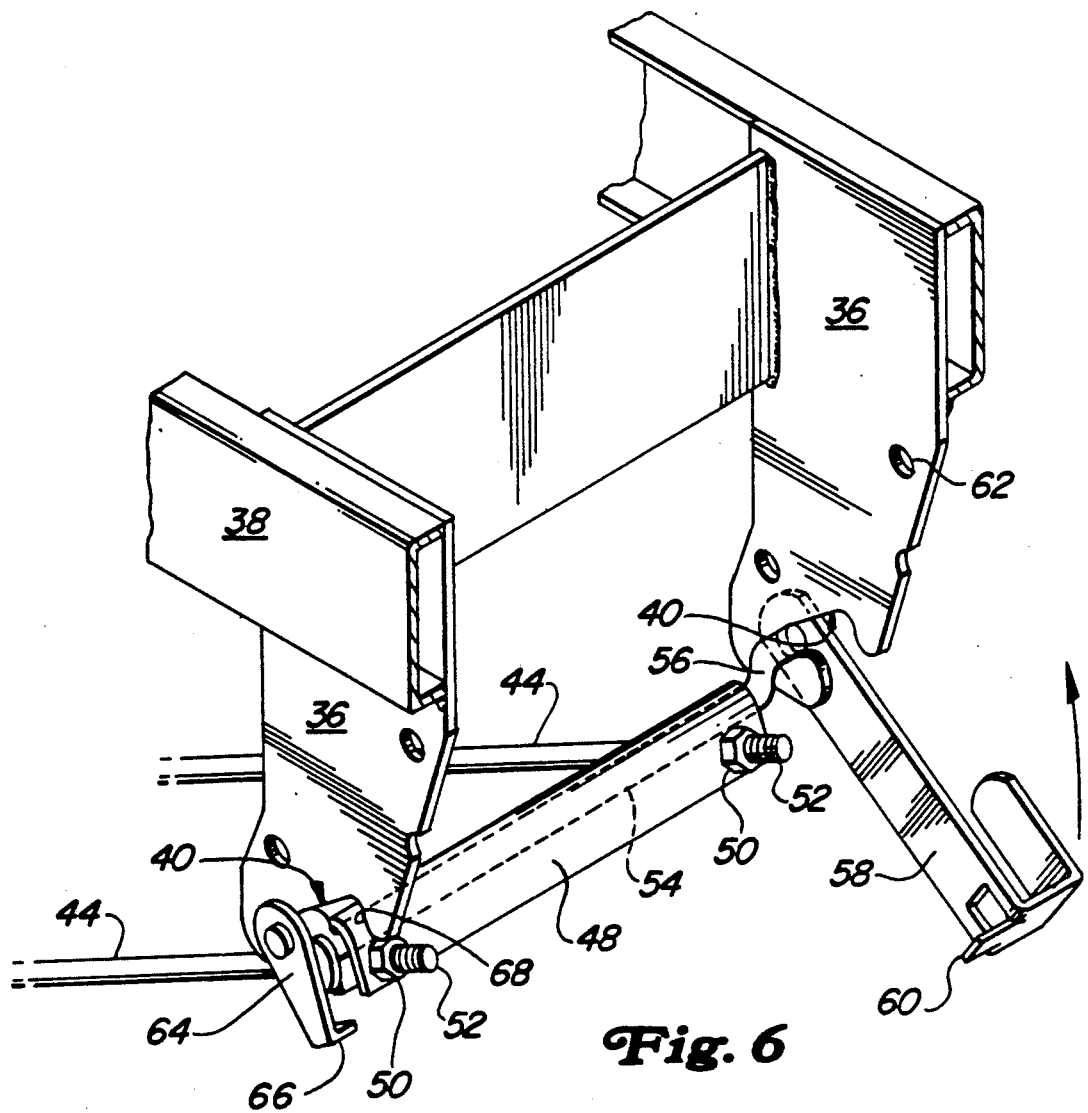
FIG. 6 is an enlarged partial view of the front suspension means prior to tensioning the draft lengths with the handle.

Looking now to FIGS. 4, 5 and 6, there is shown a hanger means 42 which is comprised of a U-shaped rod-like bar or member 43 having leg portions 44 joined to a base portion 46. The base portion 46 is adapted to be received in the upwardly opening hooks 34 carried by the implement 12. The forward ends of the leg portions or draft links 44 are received in an elongated cross-member 48 and secured thereto by nuts 50 received on threaded ends 52 of the U-shaped member 43. Through adjustment of the nuts 50, the length of the leg portions 44 can be varied.

The cross-member or sleeve 48 carries a transverse bar 54 having offset end portions 56 which are received in the jaws 40 carried by the tractor brackets 36. Carried at one end of the transverse bar 54 and rigidly attached to the offset portion 56 is a handle 58 which carries on its upper end a lug 60 which is receivable in a recess 62 carried on one bracket 36 (See FIGS. 5 and 6).

Carried on the offset portion 56 of the transverse bar 54 at its other end is an ear 64 which carries a stop surface 66 at its end. This ear 64, when positioned as illustrated in FIG. 4, will extend upwardly and forwardly and have its stop surface 66 adjacent the downwardly opening abutment or stop surface 68 carried by the tractor bracket 36.

The operation of the implement suspension mechanism will now be reviewed. When an operator wants to install the implement 12 beneath the tractor 10 he will first position the tractor 10 above the implement 12, so that the two lift links 26 can be inserted into the brackets 22. With the spring loaded J-pins 30, he need only pull on the J-pin 30 to retract the top leg 70 from the opening 71, insert the link 26 between the bracket walls 28 so that the link 26 rests on the lower leg 72 of the J-pin 30 and then release the J-pin 30. The spring 74 will urge the top leg 70 of the J-pin 30 back into the bracket opening 71 and through an aligned opening 73 in the lift link 26.

After securing the two J-pins 30 in the brackets 22 carried at the rear of the mower 12, he positions the base 46 of the U-shaped front hanger means 42 in the hook means 34 carried by the front of the mower 12. Thereafter he positions the front cross-member 54 in the jaws 40 carried by the tractor brackets 36, then grasps the handle 58, rotating it upwardly from the position illustrated in FIG. 6 to that position illustrated in FIG. 5. As the handle 58 is rotated, the transverse bar 54 serves as a pivot member and the offset portions 56 serve as bell cranks or cam means to tension the draft links 44 and provide a tight connection between the tractor brackets 36 and the implement jaws 34. Since the handle 58 is preferably comprised of a springy or resilient material, the operator can easily pull it outwardly and away from the frame bracket 36 as he rotates it upwardly. He then slips the lug 60 into the recess 62 of the bracket 36 to latch the handle 58 and the draft links 44 in the desired position.

The nuts 50 provided on the ends of the draft links 44 permit him to quickly make any necessary adjustments and provide the desired tension in the draft links 44.

Looking again at FIG. 2, there is illustrated a side view of the suspension mechanism with the four-bar parallelogram linkage arrangement illustrated by the dotted lines. This four-bar linkage is provided through the connections A, B, C and D and assures that as the operator adjusts the height of the lift linkage 24 at the back 18 of the mower 12, the front 20 of the mower 20 correspondingly will raise an equal amount. In this manner the operator is assured that the mower 12 is suspended at an uniform height above the surface for realizing the desired height of cut.

When the operator wants to remove the implement 12, he simply reverses the above discussed procedure and stores the front suspension linkage.

We claim:

1. A mechanism for mounting an implement from a vehicle comprising:

first and second support means carried between the vehicle and implement, each support means including pin means receivable through an opening of a bracket, the pin means being biased towards engagement with the opening;

hanger means supporting the implement from the vehicle, said hanger means including first and second spaced apart jaw means carried by the implement and the vehicle respectively, a U-shaped member having leg portions joined to a transversely extending first cross member, the cross member being adapted to be received in one jaw means, a second elongated cross member connected with the leg portions, spaced from the first cross member and receivable in the other jaw means, cam means coupled with one cross member and operable to shift the leg portions between forward and rearward positions; and latch means operatively coupled to the cam means for securing the leg portions in one of their positions.

2. A mechanism for detachably mounting an implement from a vehicle having upwardly opening hook means carried thereon, comprising:

first and second transversely spaced bracket means, each bracket means including a U-shaped pin means connectable with the vehicle;

draft linkage means fore and aft spaced of the first and second bracket means, said linkage means including upwardly opening hook means carried by the implement;

hanger means having first and second fore and aft spaced cross members receivable respectively in the hook means of the vehicle and the implement, said hanger means further including cam means attached to one cross member and a handle connected to the cam means for rocking the cam means between first and second positions whereby the first and second hook means are moved between closer and spaced apart positions.

3. Mechanism for releasably suspending one end of an implement from a vehicle having bracket means carried on the lower portion thereof, said bracket means including a first pair of transversely spaced apart and upwardly opening jaw means;

a second pair of transversely spaced apart and upwardly opening jaw means carried at the forward portion of the implement, said second jaw means adapted to be positioned fore and aft spaced from the first jaw means;

a pair of transversely spaced apart fore and aft extending draft links, said links having front and rear portions;

first and second fore and aft spaced and transversely extending pivot members extending between and connecting the respective front and rear portions of the links, said first and second pivot members being respectively receivable in the first and second jaw means; and cam means operatively connected to one pivot member, shiftable between first and second positions and operable to shift said pivot member between fore and aft spaced positions as the cam means is shifted between its first and second positions.

4. The invention defined in claim 3 wherein the base of a rod-like U shaped member serves as one pivot member and its sides serve as the draft links.

5. The invention defined in claim 3 wherein the draft links have means permitting fore and aft adjustment of their length.

6. The invention defined in claim 3 wherein one pivot member is carried within a sleeve member and the draft links are adjustably coupled with the sleeve member.

7. The invention defined in claim 3 wherein there is further provided a handle for moving the cam means between its first and second positions and the handle and vehicle are provided with latch means between them for securing the cam means in one of its positions.

8. The invention defined in claim 7 wherein the latch means includes a lug carried by the handle and a recess carried by the vehicle, with the lug being selectively receivable in the recess.

9. The invention defined in claim 3 wherein the cam means includes a bell crank carried by the one pivot member and a handle is coupled to one leg of the bell crank.

10. The invention, defined in claim 3 wherein stop means is provided between the one pivot member and the jaw means it is receivable in, the stop means being selectively effective to prevent movement of the one pivot member out of the jaw means.

11. The invention defined in claim 3 where there is further provided transversely spaced apart bracket means between the implement and vehicle, said bracket means being fore and aft spaced from the jaw means of the vehicle and the implement and including spring loaded J-pins carried by the implement for registering with the vehicle.

* * * * *